United States Patent
Kim et al.

(10) Patent No.: US 7,800,608 B2
(45) Date of Patent: Sep. 21, 2010

(54) DEPTH IMAGE-BASED RENDERING METHOD, MEDIUM, AND SYSTEM USING SPLATS

(75) Inventors: Keun Ho Kim, Seoul (KR); Gyeong Ja Jang, Yongin-si (KR); Shin Jun Lee, Seoul (KR); Seok Yoon Jung, Seoul (KR); Mo Young Suh, Seongnam-si (KR); Woo Nam Chung, Goyang-si (KR); Tack Don Han, Seoul (KR)

(73) Assignees: Samsung Electronics Co., Ltd., Suwon-Si (KR); Industry-Academic Cooperation Foundation, Yonsei University, Seoul (KR)

( * ) Notice: Subject to any disclaimer, the term of this patent is extended or adjusted under 35 U.S.C. 154(b) by 775 days.

(21) Appl. No.: 11/594,165

(22) Filed: Nov. 8, 2006

(65) Prior Publication Data
US 2007/0103479 A1    May 10, 2007

(30) Foreign Application Priority Data
Nov. 9, 2005    (KR) ...................... 10-2005-0107206

(51) Int. Cl.
*G06T 15/00*    (2006.01)
(52) U.S. Cl. ....................................... 345/419; 345/581
(58) Field of Classification Search ........................ None
See application file for complete search history.

(56) References Cited

U.S. PATENT DOCUMENTS

| | | | |
|---|---|---|---|
| 5,990,904 A * | 11/1999 | Griffin ......................... | 345/631 |
| 6,466,207 B1 * | 10/2002 | Gortler et al. ............... | 345/427 |
| 7,453,455 B2 * | 11/2008 | Park et al. .................... | 345/419 |
| 2004/0012603 A1 * | 1/2004 | Pfister et al. ................ | 345/582 |
| 2005/0017968 A1 * | 1/2005 | Wurmlin et al. ............ | 345/419 |
| 2005/0174346 A1 * | 8/2005 | Park et al. .................... | 345/422 |
| 2006/0038823 A1 * | 2/2006 | Arcas .......................... | 345/587 |

* cited by examiner

*Primary Examiner*—Ulka Chauhan
*Assistant Examiner*—Andrew Yang
(74) *Attorney, Agent, or Firm*—Staas & Halsey LLP (57) ABSTRACT

A method, medium, and system of rendering image data, including receiving three-dimensional space data for each pixel forming the image data, the three-dimensional space data including depth and color information values for each pixel, determining an order of rendering for a plurality of surfaces forming the image data in an order of the distance between a rendering viewpoint and the surface forming the image data, generating splat depth information values for each splat included in the surface forming the image data, according to the rendering order, and determining whether the splat included in the surface forming the image data is required to be blended and accordingly selectively performing a blending on the splat.

14 Claims, 6 Drawing Sheets

DEPTH IMAGE-BASED RENDERING METHOD, MEDIUM, AND SYSTEM USING SPLATS

CROSS-REFERENCE TO RELATED APPLICATIONS

This application claims the benefit of Korean Patent Application No. 10-2005-107206, filed on Nov. 9, 2005, in the Korean Intellectual Property Office, the disclosure of which is incorporated herein in its entity by reference.

BACKGROUND OF THE INVENTION

1. Field of the Invention

An embodiment of present invention relates to a depth-based image rendering method, medium, and system, and more particularly, to an image-based rendering method, medium, and system that blends splats disposed within a certain offset value from a three-dimensional surface of a depth-based image data with one path.

2. Description of the Related Art

Image-based rendering generates a resultant image from a random viewpoint based on three-dimensional space data of an original certain standard viewpoint (or camera). In such image-based rendering, since a real image can be input, a derivable resultant image may be generated that looks like the same real image but from a different viewpoint.

One type of image rendering is a three-dimensional depth image-based rendering method, where a resultant image is rendered by using original image information and measured spatial depth values for points and/or pixels within the original image.

In such image-based rendering, a warping process is performed to transition the original pixels, if necessary, of the original image to a new position or to have different characteristics in the resultant image. Here, since the size or shape of an object of the original image may change during warping, resulting in the generation of displayed holes or aliasing between warped objects, methods of improving image quality by optimizing the size and shape of resultant pixels of the resultant image are currently being developed.

For example, one method includes blending, by applying Gaussian filtered disk shaped splats of original image information. In this case, two conventional representative techniques include using a z-offset inspection with two paths and using a McMillan algorithm with one path.

Figure 1:
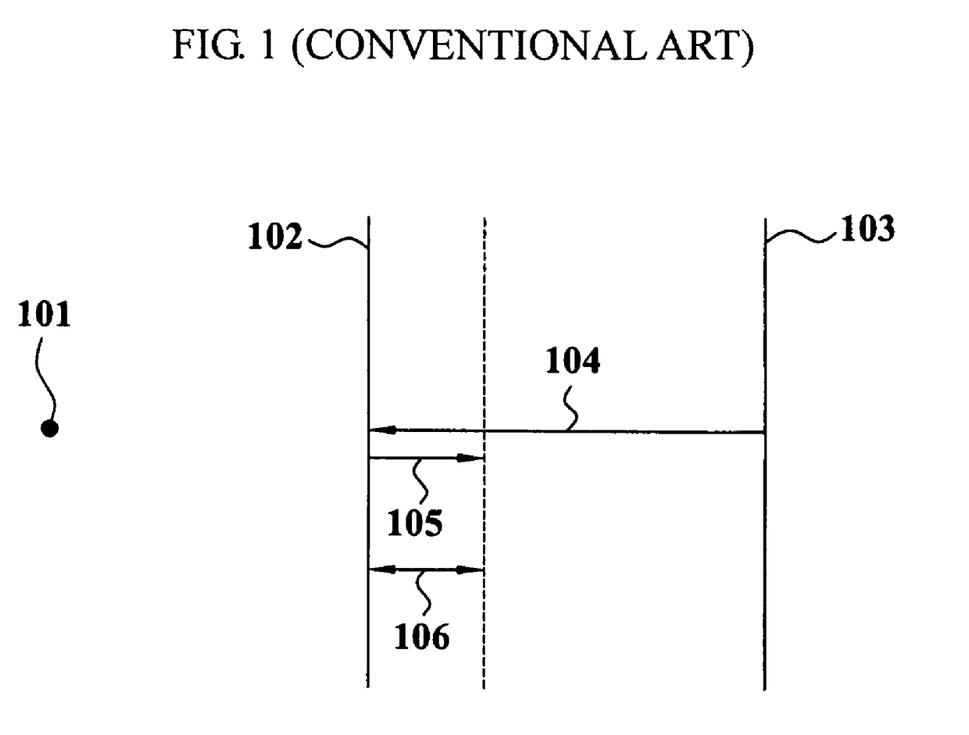
FIG. 1 illustrates an example of a conventional three-dimensional depth image-based rendering method.

FIG. 1 illustrates an example of a depth image-based rendering method to blend color in a depth direction according to such a conventional methodology where blending is performed by applying splats for a resultant image based on the z-offset inspection with two paths.

First, a depth map is generated by comparing depth information values with respect to splats included in all generated surfaces/layers to be used in forming the image. This depth map may initially include depth information for different objects of pixels seen in an original viewing of a scene or image area, e.g., pixels of objects that are part of the background may have greater depth values from a defined zero depth and pixels of objects that are closer will have lower depth value, and possibly a negative depth value.

A splat is a modifiable component, representative of warpable data for an original pixel, that can be applied to each surface forming the resultant image and can be used as a technique to transpose or warp a pixel from a standard pixel to an oblong or warped shape, or even to spread the pixel out over several resultant pixels as the resultant image is generated for a new vantage point. These splats can be generated from different surfaces and can be blended with other image data. For example, a final resultant pixel used for display of an image from a new perspective, e.g., a new view angle or direction, may be defined by several splats on different surfaces at different depths at that pixel location, with each splat potentially originating from different original pixels that have been warped according to the new perspective. When the splat information from the different surfaces is combined, the color, luminance, and/or opaqueness of the final resultant pixel can derived. The surfaces are a dimensional or layering mechanism that helps in defining the 'depth' of the image to more easily generate the final resultant image from the new perspective. Splat information at different depths may be defined on different surfaces. A more clear understanding of this concept will be found after the following discussion of these conventional methods.

Accordingly, similar to that noted above, after the warping of the splats has been done a resultant image can be put together by collecting the different surfaces, e.g., based on a depth information value of a splat computed from a difference between a distance from a central pixel on one surface to a rendering viewpoint and a distance from the rendering viewpoint to different respective splat information on different respective surfaces of the image, i.e., it's new perceived depth.

As another example, respective depth information values for putting together the resultant image, with respect to each splat included in all respective surfaces forming the image, may be generated by using the difference between a distance value from a rendering viewpoint 101 to each respective pixel included in the image and a distance value from the rendering viewpoint 101 to a respective surface 102 for the image.

In this case, using FIG. 1 as an example, the respective depth information values for a splat included in each surface may be generated in a sequenced order from an outer surface 103, furthest from the rendering viewpoint 101, to the most inner surface 102, closest to the rendering viewpoint 101, namely, in the direction of the first path 104.

Secondly, in this example, the depth information values with respect to each splat are stored in a buffer, thereby generating the depth map for the resultant image, also permitting searching for a standard splat closest to the rendering viewpoint 101 by referring to the depth map.

Third, if a calculated depth for a splat is not greater than an offset value then the corresponding information for that splat is applied to that existing surface, e.g., through a blending by referring to the depth map.

The offset value indicates a certain depth value for a surface of for the resultant image, e.g., with the depth value being based upon a depth relative to the surface closest to a viewpoint. For example, the offset value of FIG. 1 may represent a certain depth value 106 from the surface 102 of for the resultant image.

When putting the resultant image together, the depth information values of the splats disposed along the second path 105 are then read from the buffer, and it may be determined whether the depth information values represent a particular depth away from surface 102, for example, by less or equal to the offset value. For depth information values that are not greater than the offset value, color information values of the splats can be read from a buffer and information for splats can be blended and stored in a buffer.

This described z-offset inspection blending using the two paths has an advantage of improving image quality due to the blending effects. However, there is a disadvantage in that the blending speed is very slow because two paths are required, i.e., first depth information values are calculated from the illustrated 103 surface to an innermost surface along path 104 and the blending is the performed along path 105. In particular, blending speeds become even slower as image resolutions increase.

In order to overcome such disadvantages, an alternate method using the McMillan algorithm with one path has also been implemented.

Figure 2A:
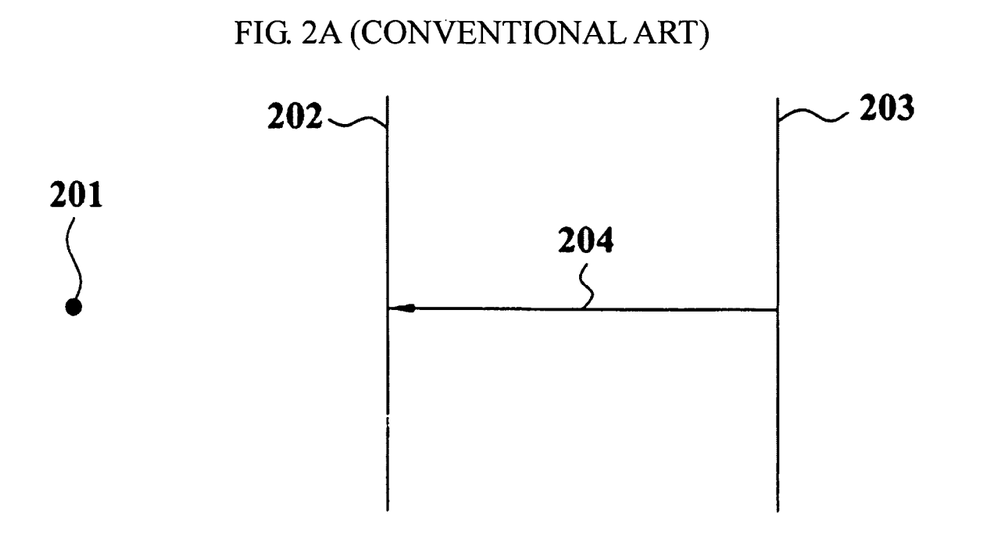
FIGS. 2A-2C illustrate another example of a conventional depth image-based rendering method.

FIG. 2 illustrates the other example of a conventional depth image-based rendering method. Referring to FIG. 2A, in the McMillan algorithm using one path, blending is performed by apply blending to all of the image data.

According to the McMillan algorithm method, when generating a resulting image, color information values with respect to splats included in all surfaces forming an image are read from a buffer, in the order from the surface 203 furthest from a viewpoint 201 to a surface 202 closest to the viewpoint 201, information for the splats are sequentially blended, and the color information values of the blended splats are stored in the buffer.

Since the described McMillan algorithm uses one path, the blending speed may be improved. However, since information on the closest surface is acquired last, an offset designating a distance from the surface closest to the viewpoint cannot be determined before blending splat, thereby causing image degradation or mixing of image information with background or hidden parts of the image.

Figure 2B:
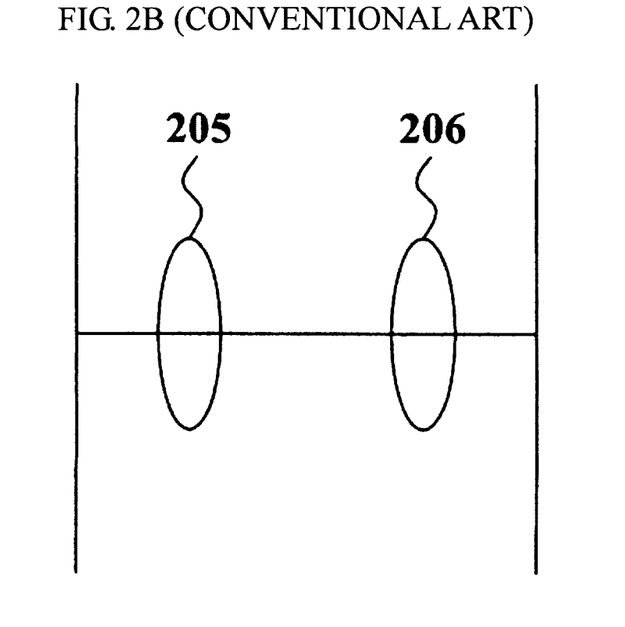

Namely, since a splat is blended without comparing depth information values of the splats during the blending, as shown in FIG. 2B, blending is performed between splats that are separated from each other more than a certain distance, such as the first splat 205 and second splat 206. When the second splat 206 corresponds to a background or covers parts of image data, differently from the first splat 205, the second splat 206 also is blended, thereby generating the described image degradation.

Figure 2C:
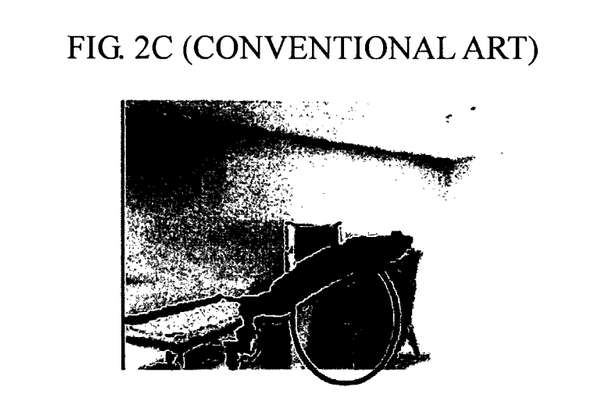

FIG. 2C thus, shows an example of a resultant image that has been generated through blending with the McMillan algorithm. Here, image degradation in the resultant image occurs due to blending based only on splats separated from each other more than a certain distance.

Accordingly, there may be a desire for a depth image-based rendering method, medium, and system with improved blending speed, improved by using one path and a blending range to improve the quality of a resultant image.

SUMMARY OF THE INVENTION

An embodiment of the present invention provides a depth image-based rendering method, medium, and system that improves a blending speed using only one path.

An embodiment of the present invention also provides a depth image-based rendering method, medium, and system where a blending range can be set up, thereby improving the quality of a result image.

A depth image-based rendering method, medium, and system may implement just one path through sequentially blending only splats disposed within a certain distance from surfaces of image data based on an offset value, thereby improving blending speed and the quality of the resultant image.

A depth image-based rendering method, medium, and system may implement a determining of a rendering order by considering a depth information value of an epipole for image data, thereby consistently rendering from surfaces of the image data inward.

Additional aspects and/or advantages of the invention will be set forth in part in the description which follows and, in part, will be apparent from the description, or may be learned by practice of the invention.

To achieve the above and/or other aspects and advantages, embodiments of the present invention include a method of rendering image data, including determining an order of rendering a plurality of surfaces for forming a resultant image based on a distance between a rendering viewpoint, different from an original viewpoint, and a surface, of the plurality of surfaces, by referring to three-dimensional space data for the image data, and selectively performing a blending on a splat of the surface in a same path as a generating of the depth information values for a plurality of splats included in the surface, in the order of rendering.

The method may further include receiving three-dimensional space data for each pixel forming the image data, the three-dimensional space data including at least respective depth information values and color information values for each pixel.

Here, the method may further include the generating of the depth information values for the plurality of splats included in the surface, according to the rendering order.

The generating of the depth information may further include generating splat information values in the same path with the performing of the blending of the splat.

Still further, the method may include receiving an offset value with respect to a range for the blending of the splat, the offset value being a depth information value from a surface, and determining whether the splat included in the surface is required to be blended and simultaneously performing the blending on the splat by determining a first depth information value of a first splat included in a surface closest to the rendering viewpoint, among the plurality of surfaces, determining whether a difference between a second depth information value of a second splat included in the surface and the first depth information value is within the offset value, generating a corresponding splat information value with respect to the second splat and performing the blending on the second splat if the difference within the offset value, and not performing the blending on the second splat when the difference does not meet the offset value.

Here, the splat may include a transparent characteristic, and the offset value may be determined based on a size of the splat and/or by a given value.

In the determining of the order of rendering the plurality of surfaces, when a depth information value of an epipole corresponding to the image data is greater than a depth information value of a corresponding center of the image data, of the original viewpoint or the resultant viewpoint, the rendering order of the plurality of the surfaces may be from an inner surface for the image data to an outer surface for the image data, and when the depth information value of the epipole less than the depth information value of the corresponding center of the image data, the rendering order of the plurality of the surfaces may be from the outer surface of the image data to the inner surface for the image data.

Here, the depth information value of the corresponding center of the image data may be zero.

To achieve the above and/or other aspects and advantages, embodiments of the present invention include at least one medium including computer readable code to control at least one processing element to implement an embodiment of the present invention.

To achieve the above and/or other aspects and advantages, embodiments of the present invention include an image-based rendering system rendering a three-dimensional image, including a depth information processing module to determine an order of rendering a plurality of surfaces for forming a resultant image based on a distance between a rendering viewpoint, different from an original viewpoint, and a surface, of the plurality of surfaces, by referring to three-dimensional space data for the image data, and a blending module to selectively perform a blending on a splat of the surface in a same path as a generating of the depth information values for a plurality of splats included in the surface, in the order of rendering.

The depth information processing module may further perform the generating of depth information values for the plurality of splats included in the surface, according to the rendering order.

The system may further include an input module to receive three-dimensional space data for each pixel forming the image data, the three-dimensional space data including at least respective depth information values and color information values for each pixel.

Still further, the system may include a buffer to temporarily store splat information values and depth information values for each splat included in the surface according to the rendering order, with the blending module using the buffer when determining whether to blend the splat.

The blending module may further determine a first depth information value of a first splat included in a surface closest to the rendering viewpoint among the plurality of surfaces, determine whether a difference between a second depth information value of a second splat included in the surface and the first depth information value is within an offset value, a depth information value from a standard surface, generate a splat information value with respect to the second splat and simultaneously performs blending on the second splat when the difference is within the offset value, and not perform the blending on the second splat when the difference does not meet the offset value.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF EMBODIMENTS

Reference will now be made in detail to embodiments of the present invention, examples of which are illustrated in the accompanying drawings, wherein like reference numerals refer to the like elements throughout. Embodiments are described below to explain the present invention by referring to the figures.

Figure 3:
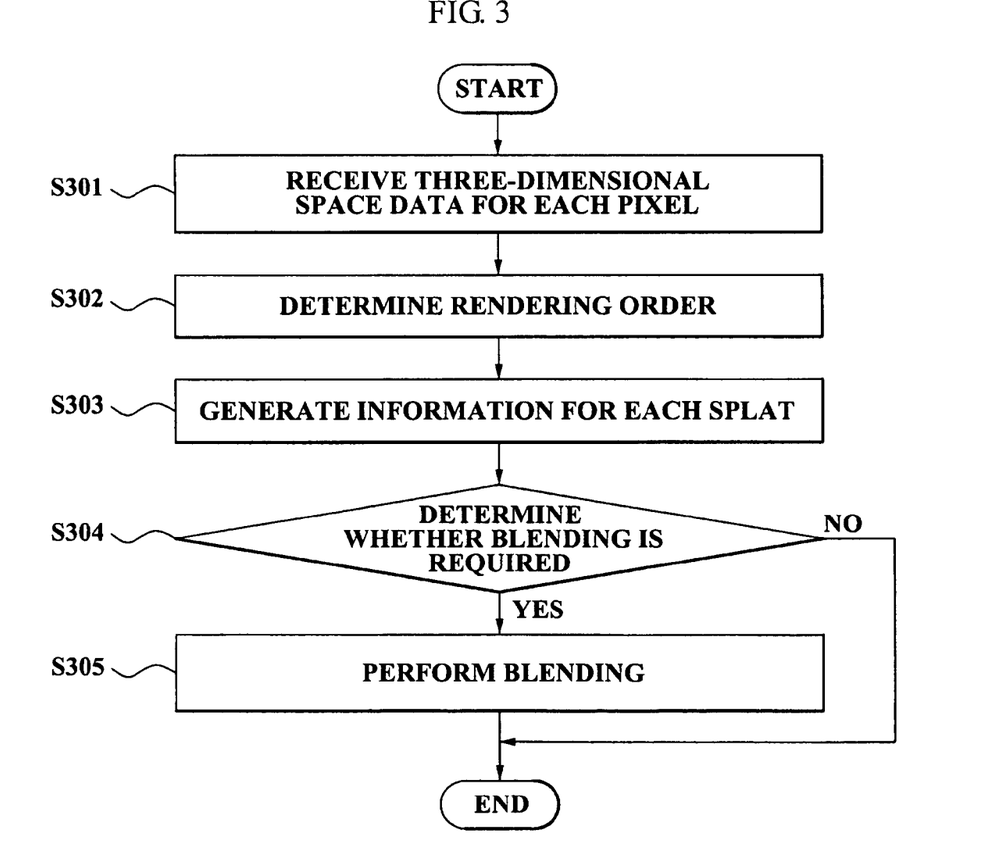
FIG. 3 illustrates a process of performing depth image-based image rendering for an original image, according to an embodiment of the present invention.

FIG. 3 illustrates a process of performing depth image-based image rendering for an original image, according to an embodiment of the present invention.

As shown in FIG. 3, in operation S301, three-dimensional space data may be received for each pixel forming image data, i.e., the three-dimensional space data may include depth information values and color information values for a plurality of pixel.

The depth information value represents depth information for a pixel in the image data and may be information for evaluating a depth from a surface for the original image data. The color information value may further represent color information for a pixel and may be one of various pieces of information classifying color as a numerical value.

The depth information value and the color information value for each pixel may accordingly be stored in a predetermined buffer, for example. Here, according to differing embodiments, the depth information values and the color information values may also be stored in different buffers. Such buffers may include all devices/methods that can be used for storing/transferring data, including memory and databases.

In operation S302, an order of rendering a plurality of surfaces forming the image data may be determined based on the order of the distances between a rendering viewpoint and the surfaces forming the image data. Here, the data for items/objects/pixels within the three-dimensional space data may have been, or may be, organized according to surfaces, e.g., a form of quantization may have been applied to the available depths, in effect generating different surfaces making up the original image. In regards to the ordering of the distances, the rendering order may be based, for example, on first rendering the surface closest to the rendering viewpoint.

The image-based rendering system may determine the rendering order according to a corresponding depth information value of an epipole of the image data. Here, the epipole is the barycentric coordinates of the rendered image data.

Namely, when the depth information value of an epipole for corresponding new perspective image data is greater than zero, the rendering order of the plurality of surfaces may be determined to be according to an ordering from an inner surface to an outer surface for the image data. When the depth information value of the epipole for the corresponding image data is less than zero, the rendering order of the plurality of surfaces may be performed from an outer surface to an inner surface of the image data. In this case, for example, a standard of the depth information value of the original barycentric coordinates of three-dimensional image data may have been set to zero, i.e., depth information for pixel data at the original barycentric coordinates surface will have a depth information value of zero, such that data beyond that surface may have depth information values greater than this zero value and data closer to the rendering surface may have negative depth information values less than this zero value.

Figure 6A:
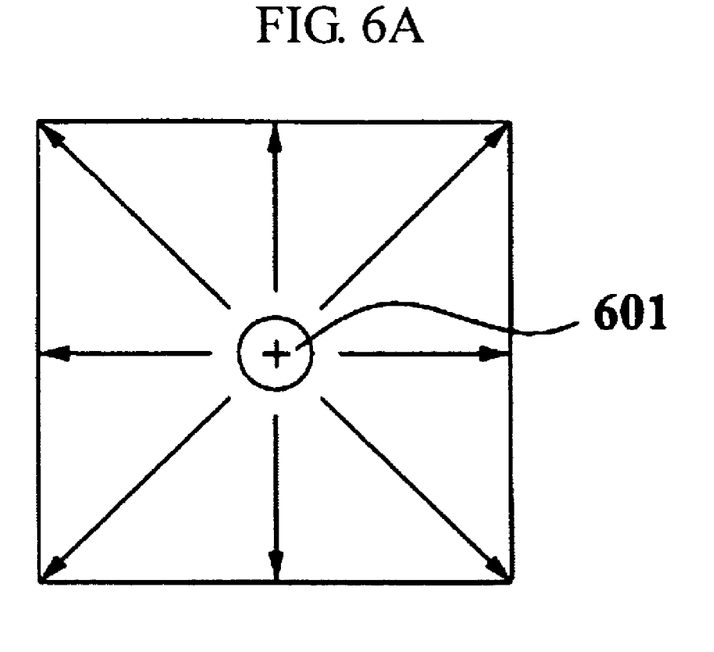
FIGS. 6A and 6B illustrate an example of a determining of an order of rendering for image data according to a depth information value of an epipole, according to an embodiment of the present invention.

Here, FIGS. 6A and 6B illustrate one example for determining an order of rendering image data according to such a depth information value of the epipole, according to an embodiment of present invention. Referring to FIG. 6A, when the depth information value of the epipole 601 for image data, based on the new viewpoint, for example, is greater than 0, the plurality of surfaces combined for generating the resultant image may be rendered according to an ordering of an inner surface to an outer surface, with FIG. 6A illustrating outward radiating rendering of surfaces down through the surfaces to the outer surface. Alternative embodiments are equally available.

Figure 6B:
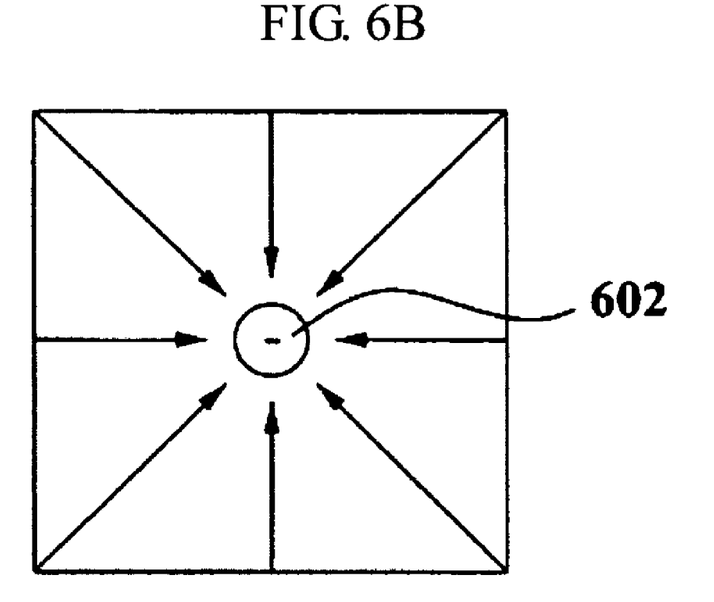

Conversely, referring to FIG. 6B, when the depth information value of an epipole 602 for image data, based on the new view point, is less than zero, the plurality of surfaces combined for generating the resultant image may be rendered according to an ordering of an outer surface to an inner surface, again, with FIG. 6B illustrating inward radiating rendering of surfaces up through the surfaces to the inner surface. Again, according to the chosen process similar to FIG. 6A, alternative embodiments are equally available.

Accordingly, in this embodiment of the present invention, the rendering order may be determined by considering the depth information value of an epipole included in image data, thereby consistently rendering surfaces in an order from an outer surface to an inner surface or from an inner surface to an outer surface, for example.

As noted above, since the image data is three-dimensional, the image data, thus, includes a plurality of surfaces that can be used to render a resultant two-dimensional image. Thus, the rendering order may be determined so that the surface closest to the rendering viewpoint is the first to be rendered, and the surface furthest from the rendering viewpoint is the last to be rendered.

In operation S303, with the above in mind, a splat information value and a depth information value for each splat included in each surface may be generated according to the rendering order.

Each splat may be applied to a respective surface, for example, and may have a certain size. For example, a transparent splat using Gaussian filtering could be used. The depth information value of the splat may be computed based on a difference between a distance from a central pixel located in the center of the splat to the new rendering viewpoint and a distance from the new rendering viewpoint to a determined first surface of the image data.

As further noted above, the splat information value of the splat may be a color information value of the splat, which may be determined by a predefined method. For example, the splat information value for a particular splat may be the color information value of the central pixel located in the center of that splat, may be computed by using a Gaussian filter on a color information value(s) of a pixel(s) included in the splat, and/or may be an average of color information values of the pixels included in the splat. For example, depending on the new viewpoint, a single splat in one surface may include information for a single original pixel or information from multiple original pixels, and may further be warped to effectively cover several pixel positions, e.g., if the splat is oblong or larger than a single pixel position. As noted, such color information may further be averaged within a splat or selectively weighted across the splat, for example, or may even have translucence information making different portions of the splat have different opacity.

The generated splat information value and the depth information value for each splat may, thus, be temporarily maintained in a storage device or may be stored in a buffer, for example, according to differing embodiments.

In operation S304, it may be determined whether the splat included in a surface is required to be blended and depending upon that determination the splat may be blended with a splat from another surface, from the direction of rendering.

In this case, an offset value with respect to a blending range may be received/defined in order to determine whether splats should be blended and the blending range may be determined to be a particular value, for example. The offset value may be the depth information value from the standard surface.

The offset value may be determined by considering the size of the splat applied. For example, when the splat is circular, the offset value may be determined to be ½ of a radius of the splat or may be an arbitrary value. Alternate embodiments are equally available.

Next, a first depth information value of a first splat included in the standard surface closest to the rendering viewpoint may be determined among the plurality of surfaces.

The first depth information value of a first splat is a standard value for determining whether a second splat of another surface is equal to or less than the offset value.

Next, with reference to a buffer, for example, it may be determined whether a difference between a second depth information value of the second splat included in the other surface and the first depth information value is equal to or less than the offset value.

For example, when the second depth information value of the second splat is "9", the first depth information value of the first splat is "1", and the offset value is "10", a difference "8" between the second depth information value "9" and the first depth value "1" is less than the offset value "10", thereby designating the second splat for blending.

When the difference is within the offset value, in operation S305, blending may be performed with respect to the second splat with reference to the buffer. This is substantially different to a conventional method that requires such comparisons to be performed in a first path, of two paths, to first generate all surfaces, i.e., additional surfaces are required to be generated if the distance between depth information and a nearest first path direction surface is greater that a predefined offset. In this conventional method, a second path is still further required.

The blending with respect to the second splat may be performed according to various methods. As only an example, the blending with respect to the second splat may be performed by using the splat information values and depth information values for each splat, stored in the buffer, or the blending may be performed by reading splat information values of splats whose depth information values are equal to or less than a certain range.

As described above, after warping image data from a standard original viewpoint to a new viewpoint, the blending may be performed to compensate for a change in size or shape of an object existing in an original image for viewing from the new view point, while attempting to avoid the generation of visible holes between warped pixels, or to avoid aliasing between warped pixels in a resultant image.

Accordingly, in an embodiment of the present invention, various techniques applying the splat information values may be used in the blending processing.

When the above difference is greater than the offset value, as a result of the determination of operation S304, the blending with respect to the splat may not be performed in this one path technique, according to an embodiment of the present invention.

Figure 4:
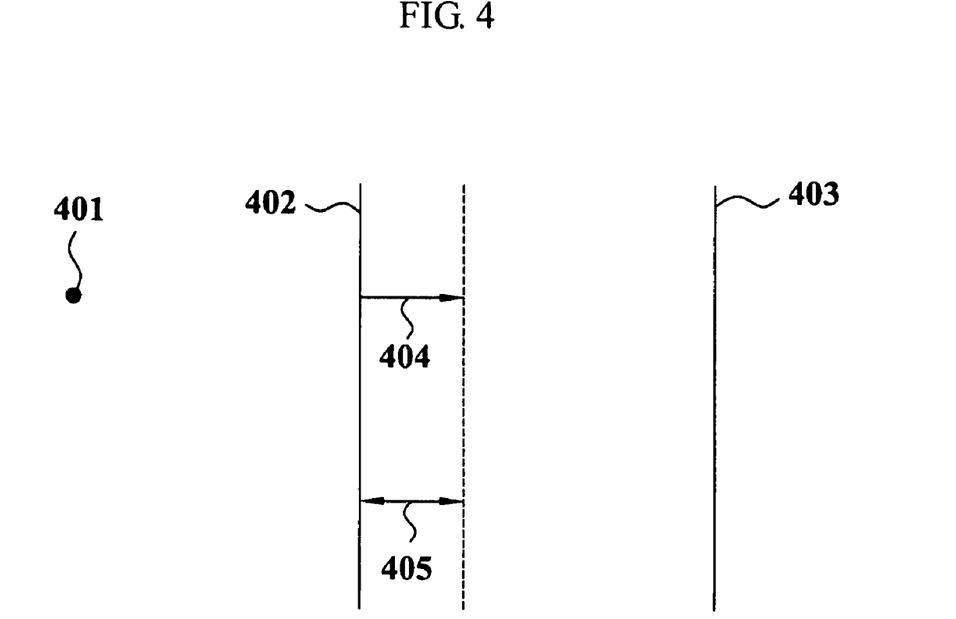
FIG. 4 illustrates a depth image-based rendering method, according to an embodiment of the present invention.

FIG. 4 illustrates a depth image-based rendering method, according to an embodiment of the present invention, showing viewpoint 401 and surfaces 403 and 402. Referring to FIG. 4, a splat information value and depth information value for each splat are generated via one path 404 for a surface according the blending of FIG. 3, for example, and then the generated depth information value may be compared with an offset value 405, i.e., the splat and depth information values and the blending may be implemented simultaneously in a single path. Here, if the depth information value is equal to or less than the offset value 405, a relevant splat is blended. If the depth information value is greater than the offset value 405, the relevant splat is not blended, and splat and depth information value generation and blending continues through the path 404 toward surface 403.

The path 404 of FIG. 4 is schematically illustrated to show an order of the blending from the surface 402 to an internal offset value. In actuality, there may be various paths for blending on all splats included in the path 404.

Accordingly, according to an embodiment of the present invention, since only splats disposed within a certain range from a surface are blended based on the offset value and by using only one path, the blending speed and image quality may be improved.

Figure 5:
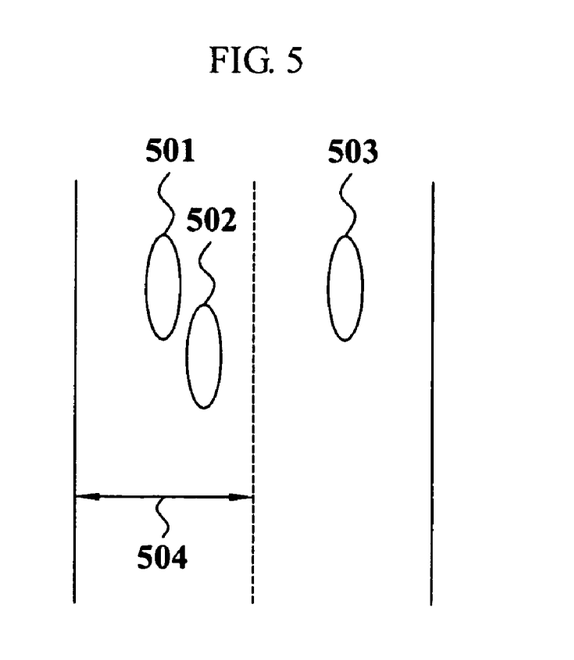
FIG. 5 illustrates a result of a depth image-based rendering method, according to an embodiment of the present invention.

FIG. 5 illustrates a result of such a depth image-based rendering method, according to an embodiment of the present invention. Referring to FIG. 5, since only the splats equal to or less than the offset value are blended while progressing through, for example, the above path 404, image degradation caused by blending all splats over an extremely broad range may be prevented.

Namely, since splats 501 and 502 disposed within the offset value are blended while progressing through the single path, a splat 503 applied to background or covered portions of the image data is not blended, thereby improving image quality.

Figure 7:
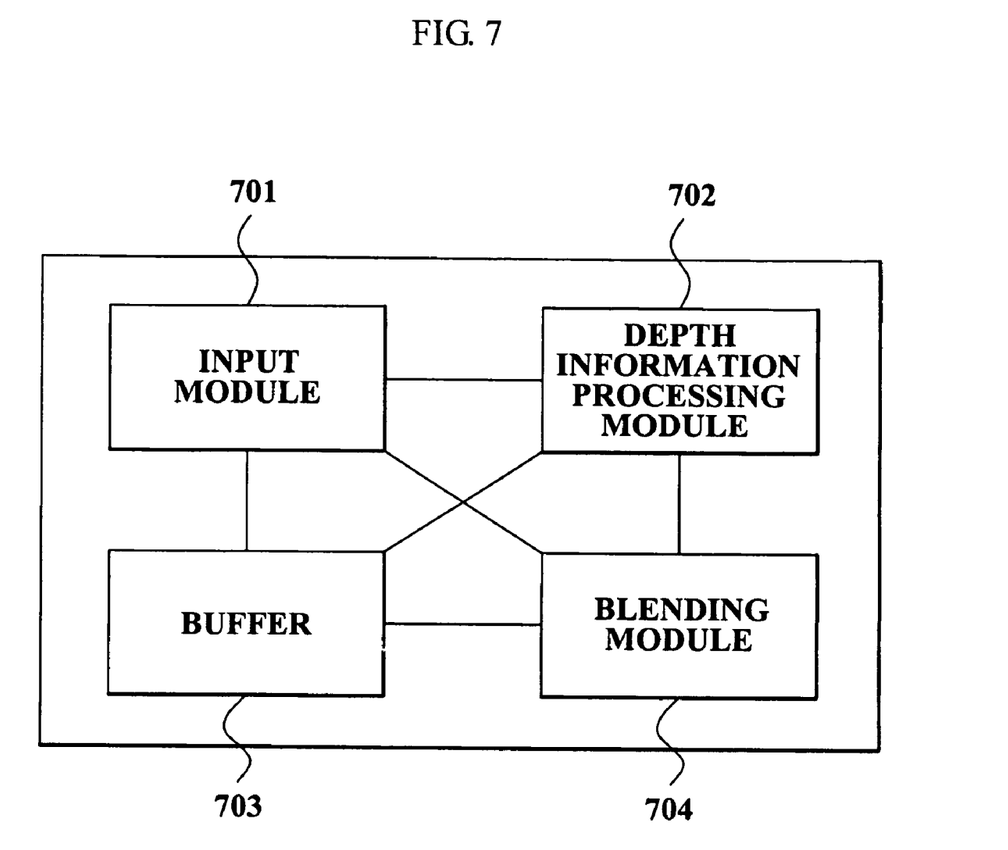
FIG. 7 illustrates a depth image-based image rendering system, according to an embodiment of the present invention.

FIG. 7 illustrates a depth image-based rendering system, according to an embodiment of the present invention. Referring to FIG. 7, a image-based rendering system may include an input module 701, a depth information processing module 702, a buffer 703, and a blending module 704, for example.

The input module 701 may receive three-dimensional space data of an image. The three-dimensional space data may include depth information values and color information values for each pixel, for example.

The input module 701 may further receive an offset value for the blending range. The offset value may be a depth information value from a standard surface, for example, as described above.

The depth information processing module 702 may determine an ordering for the rendering of the plurality of surfaces used to generate a resultant image, with the ordering being based on distances between the rendering viewpoint and a surface.

The buffer 703 may further store splat information values and depth information values for each splat for each surface, according to the rendering order, for example.

The blending module 704 may further determine whether a splat for a surface is blended by referencing the buffer and may then perform any desired blending.

Here, the blending module 704 may judge a first depth information value of a first splat included in a standard surface closest to the rendering viewpoint among the plurality of surfaces forming the image data, e.g., by referring to the buffer, determine whether a difference between a second depth information value of a second splat for the surface and the first depth information value are equal to or less than the offset value, generate the splat information value with respect to the second splat and performs blending on the second splat, e.g., by referring to the buffer when the difference is equal to or less than the offset value, and may not perform blending on the second splat when the difference is greater than the offset value. Such blending has been described in the above example embodiment of FIG. 3, noting that alternatives are also available.

Similarly, depth image-based rendering embodiments that have already been described may also be applied to the image rendering system of FIG. 7.

In addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including magnetic storage media (e.g., ROM, floppy disks, hard disks, etc.), optical recording media (e.g., CD-ROMs, or DVDs), and storage/transmission systems, for example. The media may also be a distributed network, so that the computer readable code is stored/transferred and executed in a distributed fashion. Still further, as only an example, the processing element could include a processor or a computer processor, and processing elements may be distributed and/or included in a single device.

According to an embodiment of the present invention, only splats disposed within a certain range from a surface of image data may be blended based on an offset value and as progressing through one path, e.g., resulting in an improved blending speed image quality. In one embodiment, in addition to the above discussion, there may only be a single path implementation, i.e., additional paths may be avoided.

Further, according to an embodiment of the present invention, since only splats disposed within an offset value are blended, splats applied to the background and covered portions of the image data are not blended, thereby improving image quality.

Still further, according to an embodiment of the present invention, a rendering order may be determined by considering the depth information value of an epipole included in image data, thereby consistently rendering from the surface of the image data inward.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of rendering image data in a rendering system, comprising:

determining an order of rendering a plurality of surfaces for forming a resultant image based on a distance between a rendering viewpoint, different from an original viewpoint, and a surface, of the plurality of surfaces, by referring to three-dimensional space data for the image data;

selectively, using at least one processing device, performing a blending on a splat of the surface in a same path as a generating of the depth information values for a plurality of splats included in the surface, in the order of rendering, based on an offset with respect to a range for the blending of the splat, the offset being surface depth information; and generating splat information values in the same path as the performing of the blending of the splat.

2. The method of claim 1, further comprising:

receiving three-dimensional space data for each pixel forming the image data, the three-dimensional space data including at least respective depth information values and color information values for each pixel.

3. The method of claim 1, further comprising the generating of the depth information values for the plurality of splats included in the surface, according to the rendering order.

4. The method of claim 1, further comprising:
receiving an offset value, as the offset, with respect to the range for the blending of the splat, the offset value being a depth information value from a surface; and
determining whether the splat included in the surface is required to be blended and simultaneously performing the blending on the splat by:
determining a first depth information value of a first splat included in a surface closest to the rendering viewpoint, among the plurality of surfaces;
determining whether a difference between a second depth information value of a second splat included in the surface and the first depth information value is within the offset value;
generating a corresponding splat information value with respect to the second splat and performing the blending on the second splat if the difference within the offset value; and
not performing the blending on the second splat when the difference does not meet the offset value.

5. The method of claim 4, wherein:
the splat includes a transparent characteristic; and
the offset value is determined based on a size of the splat and/or by a given value.

6. The method of claim 1, wherein the depth information value of the corresponding center of the image data is zero.

7. At least one non-transitory computer readable medium comprising computer readable code to control at least one processing device to implement the method of claim 1.

8. The method of claim 1, wherein the offset is based on a splat size or splat shape to be applied to the splat.

9. A method of rendering image data in a rendering system, comprising:
determining an order of rendering a plurality of surfaces for forming a resultant image based on a distance between a rendering viewpoint, different from an original viewpoint, and a surface, of the plurality of surfaces, by referring to three-dimensional space data for the image data; and
selectively, using at least one processing device, performing a blending on a splat of the surface in a same path as a generating of the depth information values for a plurality of splats included in the surface, in the order of rendering,
wherein, in the determining of the order of rendering the plurality of surfaces,
when a depth information value of an epipole corresponding to the image data is greater than a depth information value of a corresponding center of the image data, of the original viewpoint or the resultant viewpoint, the rendering order of the plurality of the surfaces is from an inner surface for the image data to an outer surface for the image data, and
when the depth information value of the epipole less than the depth information value of the corresponding center of the image data, the rendering order of the plurality of the surfaces is from the outer surface of the image data to the inner surface for the image data.

10. An image-based rendering system rendering a three-dimensional image, comprising:
a depth information processing module to determine an order of rendering a plurality of surfaces for forming a resultant image based on a distance between a rendering viewpoint, different from an original viewpoint, and a surface, of the plurality of surfaces, by referring to three-dimensional space data for the image data;
a buffer to temporarily store splat information values and depth information values for each splat included in the surface according to the rendering order; and
a blending module to selectively perform a blending on a splat of the surface in a same path by referring to the buffer, based on an offset with respect to a range for the blending of the splat, the offset being surface depth information,
wherein the blending module further generates splat information values in the same path as the selective performing of the blending of the splat.

11. The system of claim 10, wherein the depth information processing module further performs a generating of depth information values for the plurality of splats included in the surface, according to the rendering order.

12. The system of claim 10, further comprising an input module to receive three-dimensional space data for each pixel forming the image data, the three-dimensional space data including at least respective depth information values and color information values for each pixel.

13. The system of claim 10, wherein the blending module determines a first depth information value of a first splat included in a surface closest to the rendering viewpoint among the plurality of surfaces, determines whether a difference between a second depth information value of a second splat included in the surface and the first depth information value is within an offset value, as the offset, and a depth information value from a standard surface, generates a splat information value with respect to the second splat and simultaneously performs blending on the second splat when the difference is within the offset value, and does not perform the blending on the second splat when the difference does not meet the offset value.

14. The system of claim 10, wherein the offset is based on a splat size or splat shape to be applied to the splat.

* * * * *

UNITED STATES PATENT AND TRADEMARK OFFICE
CERTIFICATE OF CORRECTION

| | | |
|---|---|---|
| PATENT NO. | : 7,800,608 B2 | Page 1 of 1 |
| APPLICATION NO. | : 11/594165 | |
| DATED | : September 21, 2010 | |
| INVENTOR(S) | : Keun Ho Kim et al. | |

It is certified that error appears in the above-identified patent and that said Letters Patent is hereby corrected as shown below:

Column 10, Line 63 in Claim 1, after "as the" insert --selective--.

Column 10, Line 64 in Claim 1, after "blending" delete "of" and insert --on--, therefor.

Column 12, Line 28 in Claim 10, after "blending" delete "of" and insert --on--, therefor.

Signed and Sealed this
Eighth Day of March, 2011

David J. Kappos
*Director of the United States Patent and Trademark Office*